No. 774,157. PATENTED NOV. 8, 1904.
J. W. CLOUD.
SIMULTANEOUS VALVE DEVICE FOR AIR BRAKES.
APPLICATION FILED MAR. 9, 1904.
NO MODEL. 3 SHEETS—SHEET 1.

Witnesses:
Walter Tamaris
Chas. H. Ebert

Inventor:
John W. Cloud
By Paul Synnestvedt
Attorney.

No. 774,157.                                                      Patented November 8, 1904.

UNITED STATES PATENT OFFICE.

JOHN WILLS CLOUD, OF LONDON, ENGLAND, ASSIGNOR TO WESTING-
HOUSE AIR BRAKE COMPANY, OF WILMERDING, PENNSYLVANIA, A
CORPORATION OF PENNSYLVANIA.

SIMULTANEOUS VALVE DEVICE FOR AIR-BRAKES.

SPECIFICATION forming part of Letters Patent No. 774,157, dated November 8, 1904.

Application filed March 9, 1904. Serial No. 197,356. (No model.)

*To all whom it may concern:*

Be it known that I, JOHN WILLS CLOUD, a citizen of the United States, residing at London, England, have invented certain new and useful Improvements in Simultaneous Valve Devices for Air-Brakes, of which the following is a specification.

This invention has reference to pneumatic or air brake appliances for railways, and has for its principal object to provide an improved form of device whereby to secure approximately simultaneous application and release of the brakes throughout the entire length of the train, regardless of the irregularities in the flow of the air caused by the increase or decrease of the pressure therein from one end.

In pneumatic brake apparatus, as generally constructed, it is found that on account of the length of pipe under the train which carries the air backward through the various cars, any material change in the pressure in said pipe affects the forward end of the same sooner than it does the rear end, that is, if the pressure in the forward end be increased it will show quite a difference in pressure from the rear end, the difference depending upon the rate of increase, and contrariwise, when the pressure in the pipe is decreased the forward end will be the first to feel the effect of the reduction, the fluid flowing forward from the rear end after some of that at the forward end has escaped. The result of this action of the air in the pipe is that in making service applications of the brakes, and also in releasing the same, the first brakes are earlier affected than the rear brakes, and where the application is of considerable magnitude and the train long this difference in action may cause considerable surging in the train, and in the case of release, if the forward brakes let go too suddenly, may result, and in some cases does result, in pulling the train in two since the front brakes may be practically or altogether off the wheels before the rear cars begin to materially let go.

In order to overcome the above mentioned difficulties I have designed this present invention and illustrated the same in preferred form in the accompanying drawings, in which—

Figure 1:
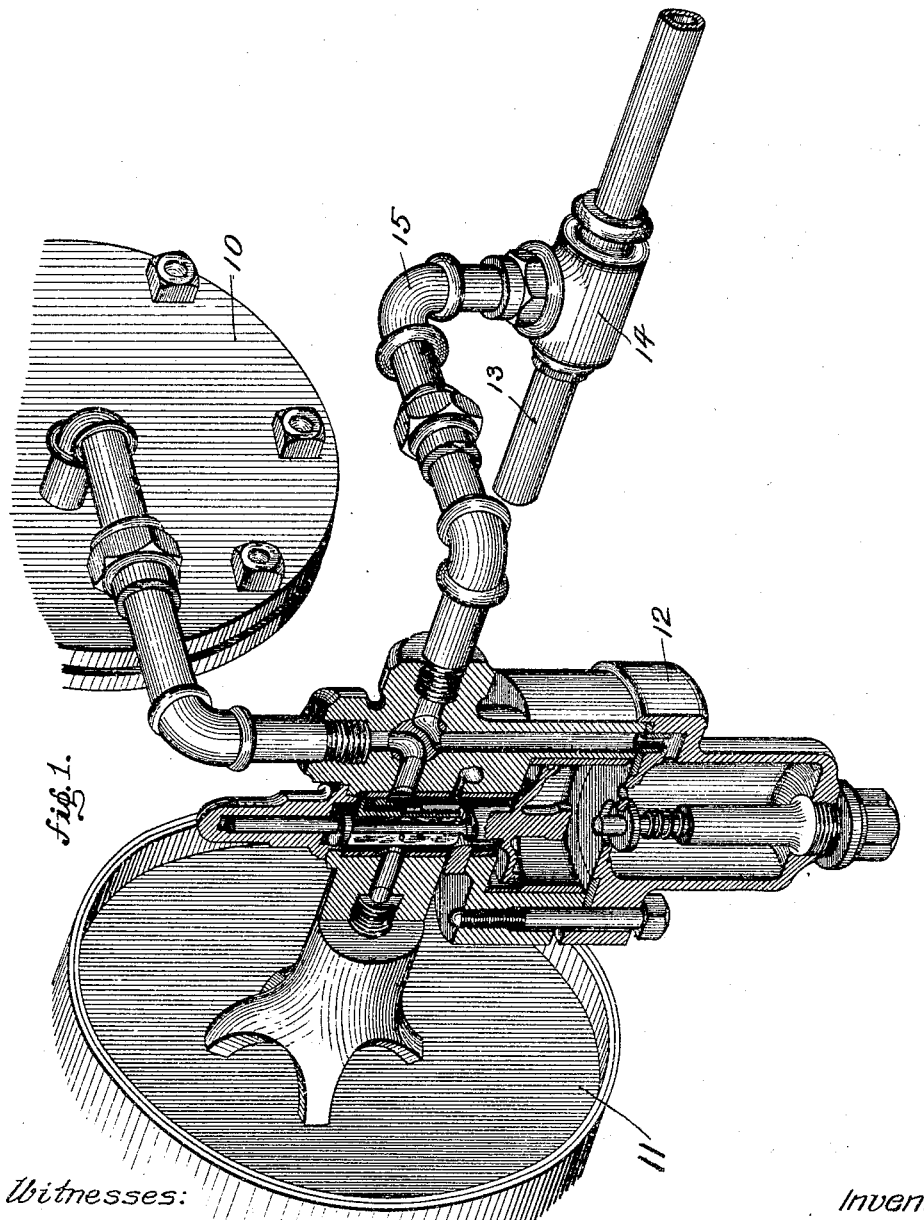
Figure 1 is a sectional perspective view showing a cylinder and reservoir with the triple valve located under the car and a short section of train pipe, the same being intended to indicate the relative positions of the several parts and the location of my improved simultaneous valve device.

Referring now more particularly to Figure 1 it will be seen that I have therein shown a brake cylinder 10 an auxiliary reservoir 11, a triple valve 12 and a train pipe 13, the arrangement and connection of the same being substantially like that which has been used heretofore in common service in what is known as the automatic air brake of the Westinghouse type. It will be observed that the train pipe 13 is provided with a branch fitting 14 from which there is a side outlet to which a pipe 15 is connected leading to the triple valve. This is the usual construction on nearly all cars.

Figure 3:
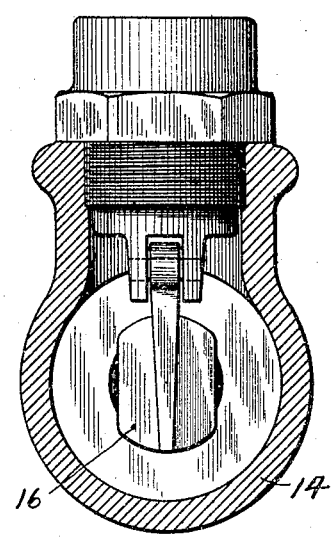
Figure 3 is a transverse section on the line (3) of Figure 2.
Figure 4:
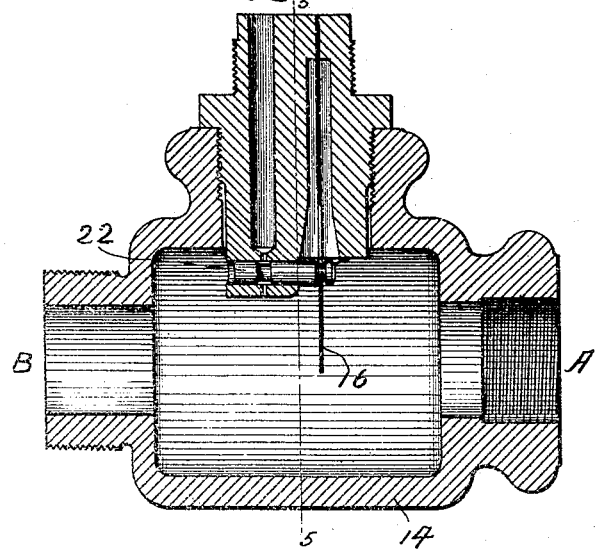
Figure 4 is a sectional view similar to the view given in Figure 2 but indicating a modified form of the device with a sliding valve mechanism in place of the puppet valve type shown in Figure 2.
Figure 5:
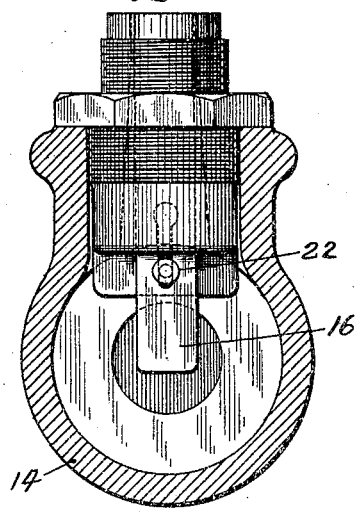
Figure 5 is a transverse view on the line (5) of Figure 4.
Figure 6:
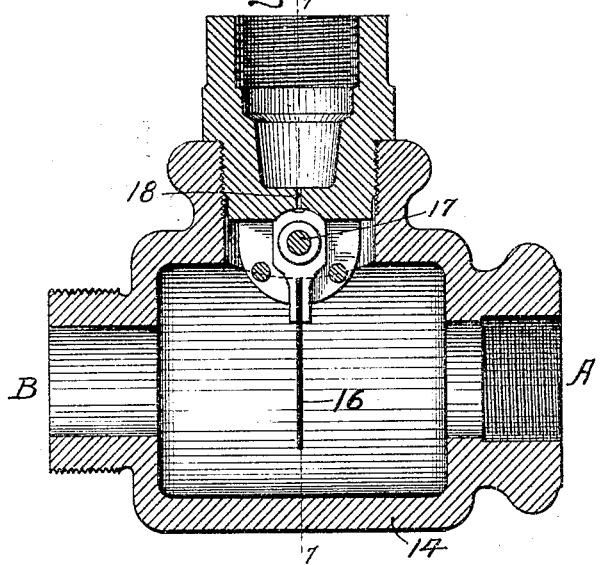
Figure 6 is a longitudinal section of another modified form of the device.
Figure 7:
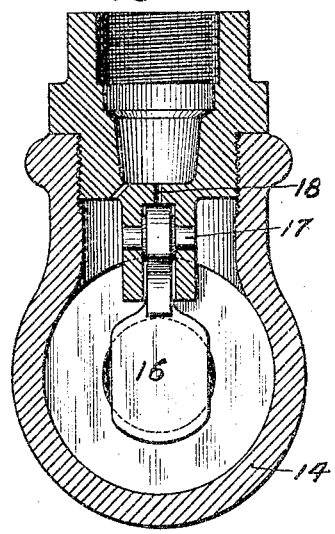
Figure 7 is a transverse section on the line (7) of Figure 6.

In carrying out my invention I provide the branch fitting 14 with a movable vane or other similar device intended to be actuated by the flow of the air in the main pipe 13 in either direction, such movable vane being coupled with means for governing the branch pipe connection or the capacity thereof. Thus, referring to Figure 6 in which the fitting 14 is shown in section, it will be seen that I have therein suspended a vane 16 about a pivotal support 17, and arranged to control a small opening 18 leading to the branch pipe, the swinging of the vane either forward or back, that is, either to the right or left, being adapted to restrict or contract the opening 18 which will be of its largest capacity when the vane hangs in vertical position, as shown in the drawing. It will be obvious that other forms of valve device and vane could be used if preferred, and for this reason I have indicated another form in Figures 8 and 9, in which the vane 16 is arranged to actuate a cylindrical valve 19 that controls the restricted opening 20 as indicated in Figure 9, and in Figures 2 and 3 I have indicated another form in which the restricted opening 18 is controlled by a puppet valve 21, which in turn is actuated by a vane 16 corresponding to the vane of the other Figures. Figures 4 and 5 indicate a sliding piston valve 22 actuated by a vane 16 through the flow of the air in the pipe.

Figure 2:
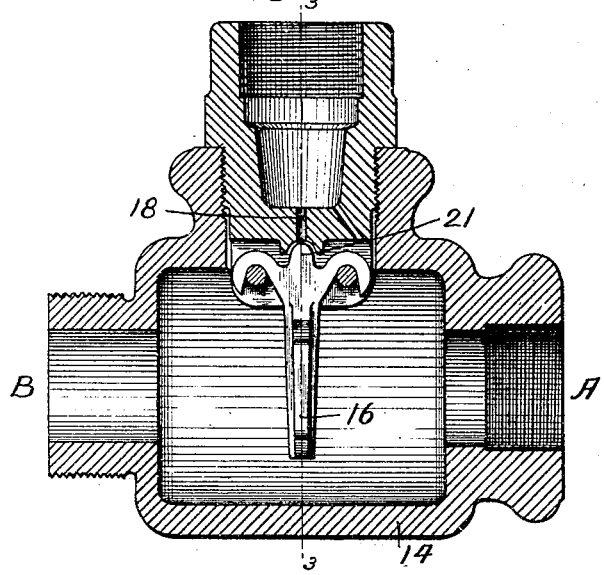
Figure 2 is a sectional view through my improved valve device showing one form of construction thereof, the section being taken on a plane longitudinal of the train pipe.
Figure 8:
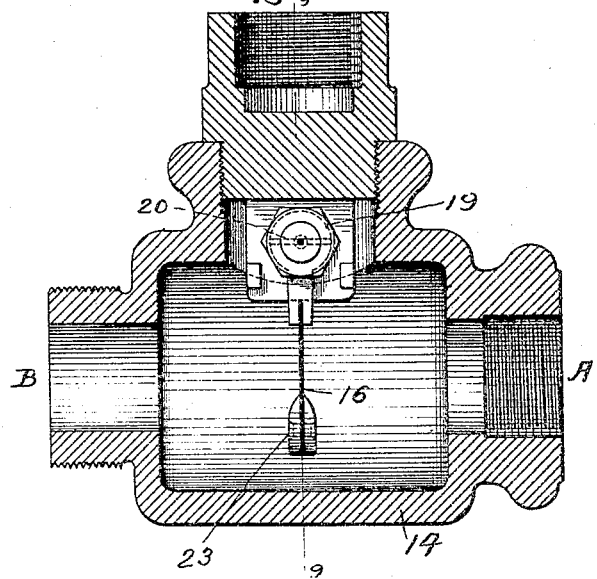
Figure 8 is a longitudinal section of still another modified form of my invention.
Figure 9:
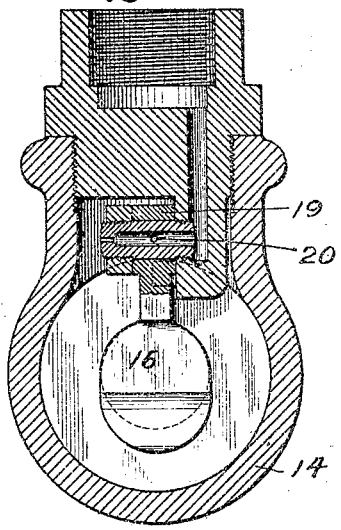
Figure 9 is a transverse sectional view taken on the line (9) of Figure 8.

If preferred the vane employed may be weighted, as by attaching a weight indicated at 23 in Figure 8, or by making the vane itself of heavier material, as indicated in Figure 2.

The operation of my improvement is as follows:

Assuming the forward end of the train pipe to be connected at the end marked A in each of the Figures 6, 8, 2 and 4, and the rear end at B in each of said figures, and assuming that the pipe is fully charged with air and all the apparatus in running condition if now it be desired to make a stop, some air is exhausted from the forward end of the pipe in the usual manner, and this creates a flow of air from B toward A, that is toward the forward end of the train, and this at each car will act upon the vane 16 in the branch connection 14 tending to move it forward and either altogether, or partially, choking the passage 18 and retarding the exhaust of pressure from the connected branch pipe until the entire train pipe has had an opportunity to feel the effect of the reduction made at the forward end. Thus, the further back in the train the branch pipe is, the less the opening thereto will be restricted and the more rapidly in proportion it will feel the effect of the train pipe reduction, and the proportioning of the openings 18 and of the vanes and the action thereof is made such as will produce, as nearly as possible, simultaneous action of the triple valves throughout the train.

In releasing the brakes the contrary action takes place, as will be readily understood without further description as it is the mere reversal of that already described.

It will be observed that in order to get the proper action of the vane employed by me it will be necessary that it should be located at or near the junction of the branch pipe on each car, and in the line of the flow of the pressure but transversly to the current.

Having thus described my invention and illustrated its use, what I claim as new, and desire to secure by Letters Patent, is the following:

1. A simultaneous valve device for air brakes and the like comprising in combination a casing containing a port or opening leading to a branch pipe and provided with a passage way forming a part of the main train pipe, means for controlling the extent or capacity of said port or opening to the branch pipe, and a movable vane located in said passage way in position to be acted upon by the current of air flowing therethrough, substantially as described.

2. A simultaneous valve device for air brakes or the like comprising in combination a casing having a port or passage way leading to a branch pipe, a passage way forming a portion of a train pipe, a valve controlling said port or opening to said branch pipe, and a vane located in said passage way in position to be acted upon by the current of air in the pipe to control the opening of said valve, substantially as described.

In testimony whereof I have hereunder signed my name in the presence of two subscribing witnesses.

JOHN WILLS CLOUD.

Witnesses:
R. DELFIELD,
A. A. BERGIN.